June 5, 1923.
H. B. COATS
VACUUM TANK
Filed April 8, 1922
1,457,922
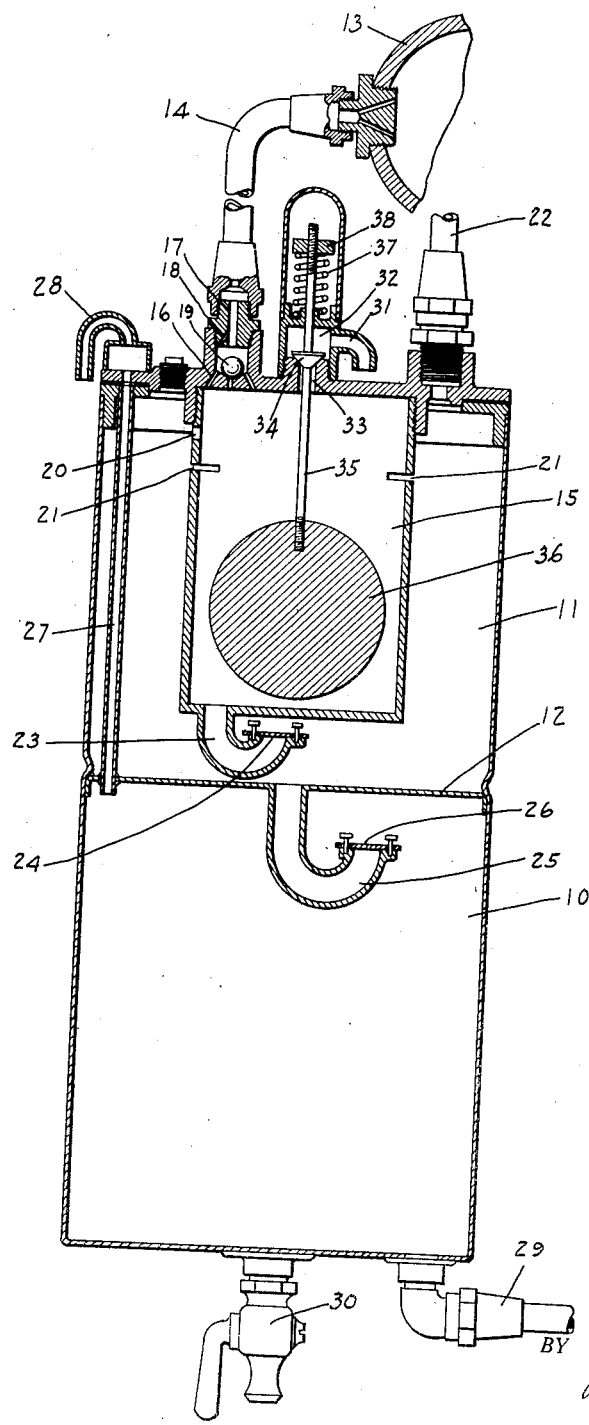
INVENTOR.
HENRY B. COATS.
BY
ATTORNEYS.

Patented June 5, 1923.

1,457,922

UNITED STATES PATENT OFFICE.

HENRY B. COATS, OF VEEDERSBURG, INDIANA.

VACUUM TANK.

Application filed April 8, 1922. Serial No. 550,866.

*To all whom it may concern:*

Be it known that I, HENRY B. COATS, a citizen of the United States, and a resident of Veedersburg, county of Fountain and State of Indiana, have invented a certain new and useful Vacuum Tank; and I do hereby declare that the following is a full, clear, and exact description thereof, reference being had to the accompanying drawings, in which like numerals refer to like parts.

This invention relates to a vacuum tank for inducing liquid fuel from the fuel supply tank to an auxiliary tank by suction from which it passes to a carbureter by gravity, in the usual manner.

It is the object of this invention to provide a more substantial controlling member, such as a weight or the like to be substituted for the usual float. Difficulty has been experienced with floats, or controlling members that are lighter than the liquid, such as cork, air tight glass bulbs or gas filled members of various kinds. The cork rots and becomes logged, the glass breaks and the metal floats deteriorate so that ultimately there occurs a leakage that destroys their functioning. By means of this arrangement the controlling member may be solid or formed in any suitable shape or of any suitable material and need not be buoyant, air tight or contain any gas which may eventually leak out.

The full nature of this invention will be understood from the accompanying drawing and the following description and claims.

In the drawing there is shown a central vertical section taken through the tank.

In the drawing there is shown a vacuum tank comprising a fuel supply chamber 10 above which is mounted the vacuum chamber 11, said chambers being supported by the partition 12. A vacuum is produced in the chamber 11 by the suction of the motor induced in the intake manifold 13, a portion of which is shown herein, which is connected through the tube or passageway 14 with a control chamber 15, there being provided between the tube 14 and the control chamber a plurality of passageways 16 through which the fuel passes from the main passage 17 or an auxiliary passage 18, said passage 17 being open and closed by a ball valve 19 for varying the suction produced therethrough depending upon the speed of the motor, as more fully set forth in my application filed February 26, 1922, bearing Serial No. 534,635.

The vacuum produced in the chamber 15 extends to the chamber 11 through the opening 20 and slots 21 in the side wall of the chamber 15. Communicating with the vacuum chamber 11 there is a fuel supply tube 22 opening therein at the top through which the fuel is drawn by the vacuum suction produced in the chamber 11. The chamber 15 also communicates with the chamber 11 through a U-tube 23 controlled by the valve 24 and the chamber 11 communicates with the chamber 10 through a U-tube 25 and a valve 26. For permitting air to enter the chamber 10 and permit the fuel to be freely drawn therefrom, there is a vent tube 27 extending upwardly therefrom through the top of the chamber 11 and having an inverted U-tube 28 communicating with the atmosphere. At the bottom of the supply chamber 10 there is a discharge tube 29 leading to the carbureter, and a pet cock 30 for draining said chamber.

For controlling the vacuum and the suction created thereby, whereby the fuel intake is regulated, there is provided an air inlet 31 entering the chamber 32 located above the top of the chamber 15 and communicating with said chamber through a passage 33 which is controlled by the valve 34 adapted to seat therein. The valve 34 is mounted on a stem 35 which extends through the passage 33 and is secured at its lower end to the weight 36 contained in the chamber 15. Said weight may be of any desired shape and may be either solid or hollow or formed of metal or any other suitable material, it being preferable, however, that it have appreciable bulk. Mounted above the chamber 32 and surrounding the upper portion of the stem 35 there is a position spring 37 which is held in place by the washer 38.

In operation the weight 36, in connection with the spring 37, operates very much like the usual float, but eliminates the undesirable features of a float. It is heavier than the liquid, but with the aid of the spring and the liquid displaced thereby it may be elevated so as to open the passage 33 and break the vacuum. In normal position the passage 33 is closed so that no air enters the chambers and with the suction of the motor a vacuum will be produced therein by the air contained in such chambers being drawn through the tube 14. The suction produced by the vacuum will draw the liquid fuel into the chamber 11 which will in turn fall by gravity into the chamber 10. When the chamber 10 is filled the liquid will rise in the chamber 11 to a level with the slots 21, upon which it will enter the chamber 15 and submerge the weight 36. Upon the weight 36 being sufficiently submerged so that the compression spring 37 will overcome its submerged weight, it will be elevated so as to elevate the valve 34 from its seat and thereby open the passage 33 to the atmospheric pressure. The vacuum will then be broken, the air drawn into the manifold through the air opening 31, and the suction of fuel discontinued. Upon the fuel being used, its level in the chamber 11 will fall, and upon it reaching the level of the chamber 15, the level therein will fall therewith passing through the valve 24 until the weight is sufficiently uncovered to overcome the compression of the spring 37 and cause said valve to close. Thereafter the operation will be repeated as above described.

The invention claimed is:

1. A tank for containing liquid having a passage therein, a valve for controlling said passage, a weighted controlling member heavier than the liquid contained in said tank to which said valve is connected, and means connected with said weight and valve for actuating the same and controlling said passage upon a portion of said member being submerged in the liquid contained by said tank.

2. A vacuum tank having a suction passage and a fluid intake passage communicating therewith, an air passage, a valve in said air passage adapted to permit a vacuum to be created in said tank when closed and to break said vacuum when opened, a weighted controlling member heavier than the liquid contained in said tank to which said valve is connected, and means connected with said weight and valve for actuating the same and controlling said passage upon a portion of said member being submerged in the liquid contained by said tank.

3. A vacuum tank having a suction passage and a fluid intake passage communicating therewith, an air passage, a valve in said air passage adapted to permit a vacuum to be created in said tank when closed and to break said vacuum when opened, a solidly formed controlling member heavier than the liquid contained in said tank to which said valve is connected, and means connected with said member and valve for actuating the same and controlling said passage upon a portion of said member being submerged in the liquid contained by said tank.

4. A vacuum tank having a suction passage and a fluid intake passage communicating therewith, an air passage, a valve in said air passage adapted to permit a vacuum to be created in said tank when closed and to break said vacuum when opened, a weighted controlling member heavier than the liquid contained in said tank to which said valve is connected, and a spring mounted in connection with said member for elevating it upon its displacement of said liquid for opening said valve and breaking the vacuum and permitting it to return to normal position by reason of its weight upon ceasing said displacement for closing said valve.

5. A vacuum tank having a suction passage and a fluid intake passage communicating therewith, an air passage, a valve stem extending vertically through said passage, a valve mounted on said stem for closing said passage, a weighted control member heavier than the liquid secured to the lower end of said stem for manually maintaining said valve in closed position, and a spring mounted on said stem containing said valve for elevating said member when a portion thereof is submerged for closing said valve to open and permit said member to close said valve upon its submerged portion being decreased, substantially as described.

6. A vacuum tank having a suction passage and a fluid intake passage communicating therewith, an auxiliary chamber mounted on said vacuum tank, an air passage, a valve stem extending vertically through said passage, a weighted control member heavier than the liquid secured to the lower end of said stem for manually maintaining said valve in closed position, and a spring mounted on said stem containing said valve for elevating said member when a portion thereof is submerged for closing said valve to open and permit said member to close said valve upon its submerged portion being decreased, substantially as described.

In witness whereof, I have hereunto affixed my signature.

HENRY B. COATS.